Dec. 29, 1936.  N. T. DIETRICH  2,065,665
AUTOMOBILE ENGINE MOUNTING AND SPRING SUSPENSION
Filed Sept. 24, 1930  2 Sheets-Sheet 2
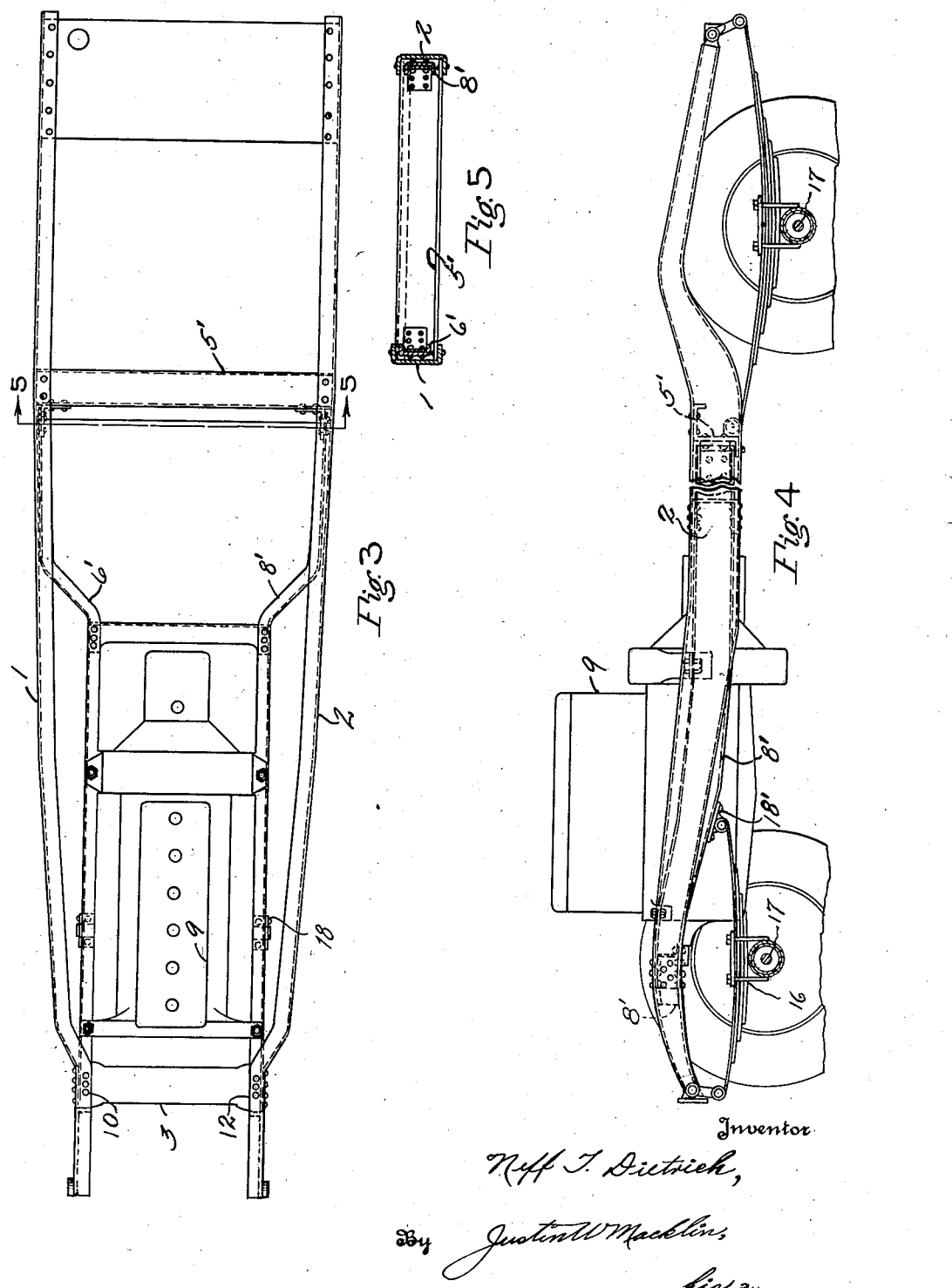

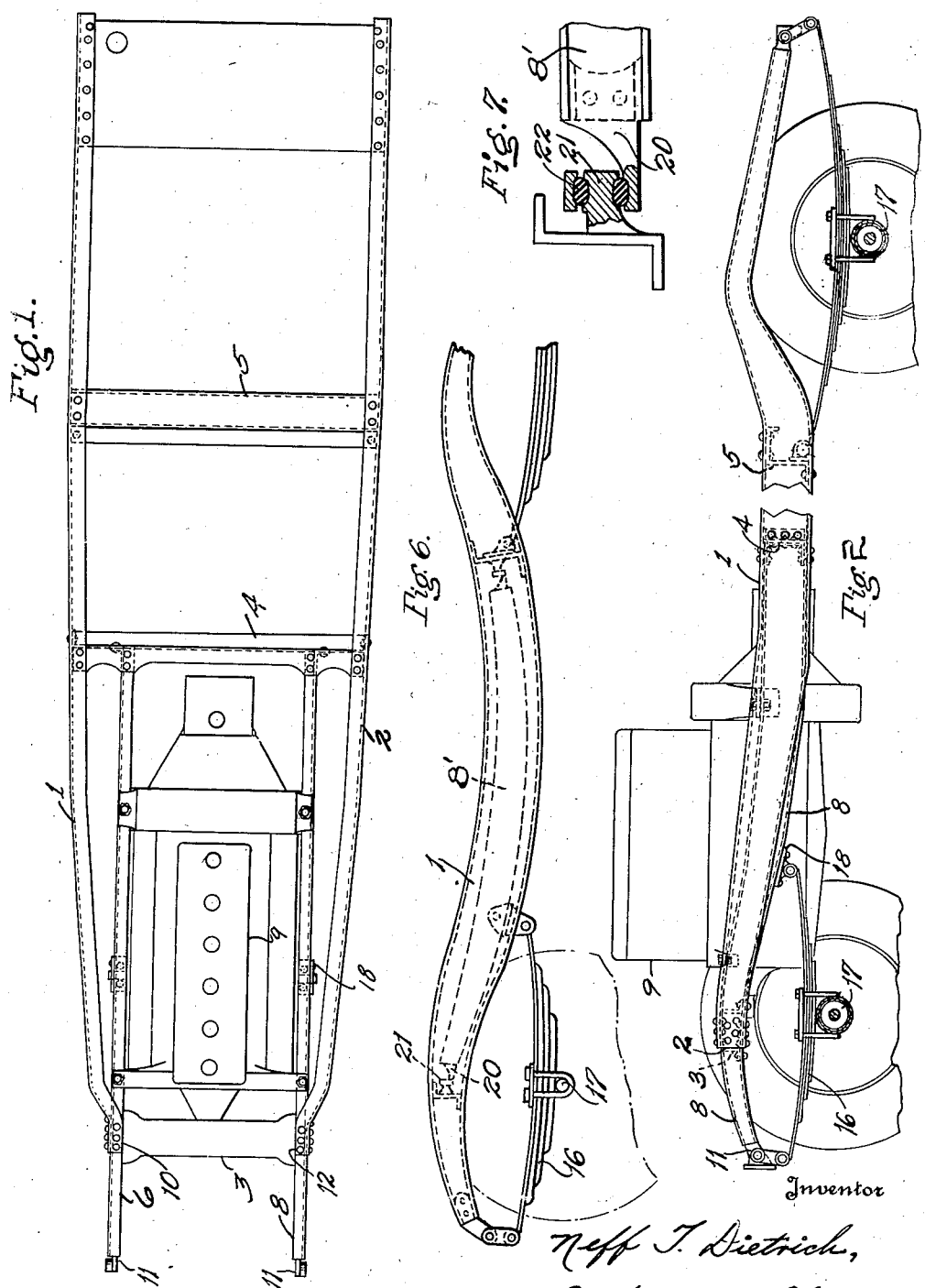

Patented Dec. 29, 1936

2,065,665

UNITED STATES PATENT OFFICE 2,065,665

AUTOMOBILE ENGINE MOUNTING AND SPRING SUSPENSION

Neff T. Dietrich, Detroit, Mich., assignor to The Midland Steel Products Company, Cleveland, Ohio, a corporation of Ohio Application September 24, 1930, Serial No. 484,001

5 Claims. (Cl. 180—64)

This invention relates to automobile frames and is particularly concerned with an automobile engine mounting and spring suspension for the frame, which greatly reduces vibration and torsional or other stresses of the frame and body of the automobile.

In the present types of automobile frame, the engine is supported in brackets or on cross members which are directly connected to the side rails of the main frame, thus transferring the weight of the engine directly onto the side rails.

The springs also are connected to the main frame, so that impacts and road shocks resulting from engagement of the wheels with rough or irregular surfaces are transmitted through the springs directly to the frame.

As a result, the frame is subjected to more or less constant vibration and severe lateral stresses and bending moments when the automobile passes over obstacles or rough roadway. These stresses not only cause a great amount of wear of the frame with a consequent shortening of its period of usefulness but the vibrations are transmitted to the body and are objectionable from the standpoint of comfort of the occupants.

A very noticeable result of these stresses is the so-called "front end movement" of the automobile. This action causes a relative movement between the body and the front part of the car such as the radiator, engine, hood and lights.

My invention greatly reduces these vibrations and stresses and the resultant wear on the frame consequently increasing the period of usefulness of the frame. At the same time it provides an engine support which is simpler than the presently used types.

Lateral swaying or weaving and "shimmying" of the front end of the car is likewise greatly reduced by my invention, not only by the manner of supporting the engine to reduce vibration and stresses transmitted to the frame, but also by the fact that my engine support greatly increases the lateral rigidity of the frame in front of the dash line.

A specific object of my invention is to relieve the usual torsional stresses transmitted to the frame from the engine.

Another object of my invention is to reduce the cost and simplify the construction of automobile frames while accomplishing the above objects. These and other advantages and features of my invention will become apparent from the following specification in which reference is made to the drawings.

In the drawings:—

Fig. 1 is a plan view of an automobile frame embodying my invention.

Fig. 2 is a side elevation of the frame illustrated in Fig. 1.

Fig. 3 is a plan view of a modified form of frame embodying my invention.

Fig. 4 is a side elevation of the frame illustrated in Fig. 3.

Fig. 5 is a cross sectional view taken on a plane indicated by the line 5—5 of Fig. 3.

Fig. 6 is a side elevation of part of the frame showing a modified sub-frame and method of connecting the same to the main frame.

Fig. 7 is an enlarged fragmentary longitudinal section through the main frame illustrating in section, the manner of resiliently connecting the sub-frame to the main frame.

In general my invention contemplates the utilization of the inertia of the engine in resisting shocks or vibrations arising from impact or movement of the wheels against or over irregular or uneven surface. It is well known that the inertia of a mass as large as the engine on the present day automobiles will offer considerable resistance to any forces tending to change its speed or movement along a given path. This property of a large mass is more pronounced in the case of very sharp, quick impacts, such as result from the wheels striking depressions or rough portions of the roadway.

I utilize this inertia of the engine and auxiliary parts by so supporting the engine and suspending the springs that the forces arising from movement or impact of the wheels are directed against the mass of the engine and thus are absorbed and prevented from entering the main frame work of the car.

One manner in which I accomplish these results is by means of a frame having an engine support and spring suspension such as illustrated in Fig. 1. As there illustrated, my invention is shown in connection with one of the commonly used types of automobile frames comprised of side rails 1 and 2 of the conventional type held in spaced relation by a number of cross members such as 3, 4 and 5 rigidly secured to the side rails. The side rails 1 and 2 support the main body of the car, a part of the engine weight also being transferred thereto through the support of my invention.

Connected to the side rails 1 and 2 are longitudinal members 6 and 8 which comprise the main members of a sub-frame, on which the engine 9 is mounted. These members 6 and 8 may be fastened to the cross member 3 or directly to the main frame side rails 1 and 2, the points of connection, as indicated at 10 and 12, being positioned close to the front of the side rails, for instance, about in line with the radiator of the automobile. These sub-frame members extend rearwardly of the main frame from the points of connection as will later be described. The front portion of the sub-frame members 6 and 8, may extend forwardly a short distance beyond the side rails 1 and 2 to form the usual support for the front hanger of the front spring of the automobile, or, if a particular case requires, the members 6 and 8 may terminate close to the radiator line and the main frame side rails 1 and 2 extend forward of the radiator in the conventional manner to engage the front hangers of the front springs.

As above mentioned the sub-frame members 6 and 8 extend rearwardly from the front of the frame to a cross member 4 to which they may be rigidly secured. In the form illustrated, the cross member 4 is positioned back of the transmission gearing.

As better illustrated in Fig. 2, the members 6 and 8 may be bent downwardly from front to rear for convenience in attaching the engine and to hold the engine in the usual position relative to the main frame. This permits the use of the sub-frame with the present type of main frame without necessitating any material change in the construction of either. Further, the sub-frame can be positioned and formed so that the engine connections may be simplified.

From this standpoint, it is generally advantageous to make the members 6 and 8 comparatively straight or with slight outward bow from front to rear so that if the usual rubber mountings are used for the engine, they may be very simple in form.

Secured to the forward end of the members 6 and 8 by the usual shackle connections are springs 16. These springs support the wheel axles 17 in the usual manner and extend rearwardly, the rear ends being secured in hangers 18 on the sub-frame members 6 and 8 instead of the side rails 1 and 2, as is usually done. This simplifies the spring suspension inasmuch as the spring may extend longitudinally parallel to the center line of the car. The point of suspension of the rear end of the spring to the sub-frame members 6 and 8 is preferably positioned somewhat centrally of the engine or as near as possible beneath the center of gravity of the engine and heavy auxiliary parts considered as a single mass.

In some cases it is necessary to utilize a greater amount of the space between the side rails 1 and 2, in which case the sub-frame members 6' and 8' may be flared outwardly so as to nest within the members 1 and 2 respectively, without being in contact with such members. A frame embodying this construction is illustrated in Figs. 3, 4 and 5. In order to conserve and render available the entire space between the frame members 1 and 2, the sub-frame members 6' and 8' may be nested within the frame members 1 and 2 from their forward point of connection therewith, then extending rearwardly in a straight line as far as the rear of the engine, and then flaring outwardly as illustrated in Fig. 3. Such an arrangement permits the use of all the space between the frame members 1 and 2, thus furnishing as much space within which to mount the engine as is available when a sub-frame is not used. It will be apparent that the forward ends of the side rails both 1 and 2 are extended forwardly beyond the forward ends of the side rails 6' and 8' of the supplemental frame, in which instance, the front hangers of the front springs 16 are suspended from the forward ends of the main frame side rails 1 and 2. Other changes in the shape of the main and sub-frames may be made, the particular frames in the drawings being shown only for illustrating the principles of my invention.

In all cases in which the sub-frame members are nested within the members 1 and 2 the flanges and webs of the sub-frame members are in spaced relation to those of the frame members 1 and 2. Where the auxiliary apparatus on the automobile permits the members 6' and 8' may extend almost entirely to the rear of the main frame, for instance, to a point where the front hangers or brackets of the rear springs are attached to the main frame or to a cross member thereon as shown in Figs. 4 and 6.

At this position the members may be secured to the cross member 5' supporting the spring hangers as shown in Figs. 3 and 4. As in the case of the rear hangers of the front springs, they may directly engage the rear spring hangers. This arrangement would reduce stresses on the frame even more and would practically eliminate front end movement and vibration of the automobile and twisting or bending of the main frame, thus relieving the vibration and other stresses on the body itself with an increase in comfort for the occupants of the car.

In this manner any impacts against the front wheels are transmitted through the axle and springs to the sub-frame and consequently to the engine. Obviously by keeping this point of connection near the center of mass of the engine and auxiliary equipment carried by the sub-frame any tendency of the engine to tilt about an axis through the points of suspension of the springs is very greatly reduced and the full effect of the inertia or resistance to change of the engine and auxiliary parts is applied to resist the impacts transmitted from the wheels. By the use of these engine mountings and spring suspensions, the force of impact is largely dissipated by flexing the spring against the weight of the engine. Part of this energy may be transferred into work, lifting the engine mass a short distance, but a far larger amount is absorbed in the flexed spring and given up by the spring in returning to its normal position before the initial inertia of the engine is overcome.

The springs 16 relieve the impact shocks on the wheels and axles and prevent any damage thereto which might result from the resistance of the engine.

Consequently, a very reduced movement or force is transmitted from the wheels to the sub-frame and a very slight effect is produced on members 1 and 2. It is advantageous to place the cross member 4 a greater distance to the rear of the engine than illustrated in Fig. 1, as obviously this throws more of the weight of the engine above the points of suspension of the springs 16.

As a result of supporting the engine mass in this manner, the main frame will be relatively free from vibration and impacts, due to such stresses being resisted by the inertia of the engine mass. The well known lateral stresses and torque reactions may be largely taken up in the sub-frame which may be rigid enough to withstand these, thus still more relieving stresses of the frame and reducing the so-called front end movement and "shimmying" of the automobile.

To further isolate any shocks, the points of connection of the sub-frame members and frame members 1 and 2 may be somewhat resilient or flexible. Such connections could be effected through castings 20 attached to the forward and rearward ends of the sub-frame members and complementary castings 21 attached to the main frame members 1 and 2 or cross members thereof. The castings could then be secured together with rubber or other yieldable material 22 therebetween.

I claim:

1. In a motor vehicle, a main frame including channeled side rails, an engine, an engine supporting supplemental frame including a pair of side members connected at their forward ends to the forward end of the main frame, said side members extending longitudinally of the side rails and engine rearwardly of the main frame, said side members being bent outwardly toward the side rails and then substantially parallel therewith and nested for movement within the channels of the side rails and having their rear ends secured to the main frame, and front axle springs connected at one end to the supplemental frame and at their other end to the main frame.

2. In a motor vehicle, a main frame including side rails and a rear cross member, rear axle springs, spring hangers therefore connected to the rear cross member, an engine, an engine supporting frame including a pair of side members connected at their forward ends to the main frame, said side members extending rearwardly longitudinally of the side rails and engine, said side members being bent outwardly toward the side rails and then substantially parallel therewith and having their rear ends secured to the rear cross member, and front axle springs connected at one end to the supplemental frame and at their other ends to the main frame.

3. In a motor vehicle, a main frame including side rails and a rear cross member connecting the same adjacent the rear ends thereof, rear axle springs, front spring hangers therefor connected to said rear cross member, an engine, an engine supporting frame including a pair of side members connected at their forward ends to the forward end of the main frame and extending longitudinally of the side rails, the rear ends of said side members being connected to said rear cross member, and front axle springs connected at one end to the engine supporting frame and at the other ends to the main frame.

4. In a motor vehicle, a main frame including side rails and a cross member connecting the same adjacent the rear ends thereof, rear axle springs, spring hangers therefor including front rear spring hangers connected to said cross member, an engine, an engine supporting frame including a pair of side members resiliently connected at their forward ends to the main frame and extending longitudinally rearwardly of the side rails, and the rear ends of said side members being resiliently connected to said cross member, and front axle springs connected at one end to the engine supporting frame and at their other ends to the main frame.

5. In a motor vehicle, a main frame including a rear cross member, rear axle springs, spring hangers therefor connected to the rear cross member, an engine, an engine supporting supplemental frame having its front end connected to the forward end of the main frame and extending rearwardly and connected to the rear cross member, and front axle springs connected at one end to the supplemental frame and at their other end to the main frame.

NEFF T. DIETRICH.